H. W. WHELAN.
MACHINE FOR PRINTING, CUTTING, AND SEPARATING PAPER MATCHES.
APPLICATION FILED FEB. 28, 1910.
1,049,019.
Patented Dec. 31, 1912.
5 SHEETS—SHEET 1.
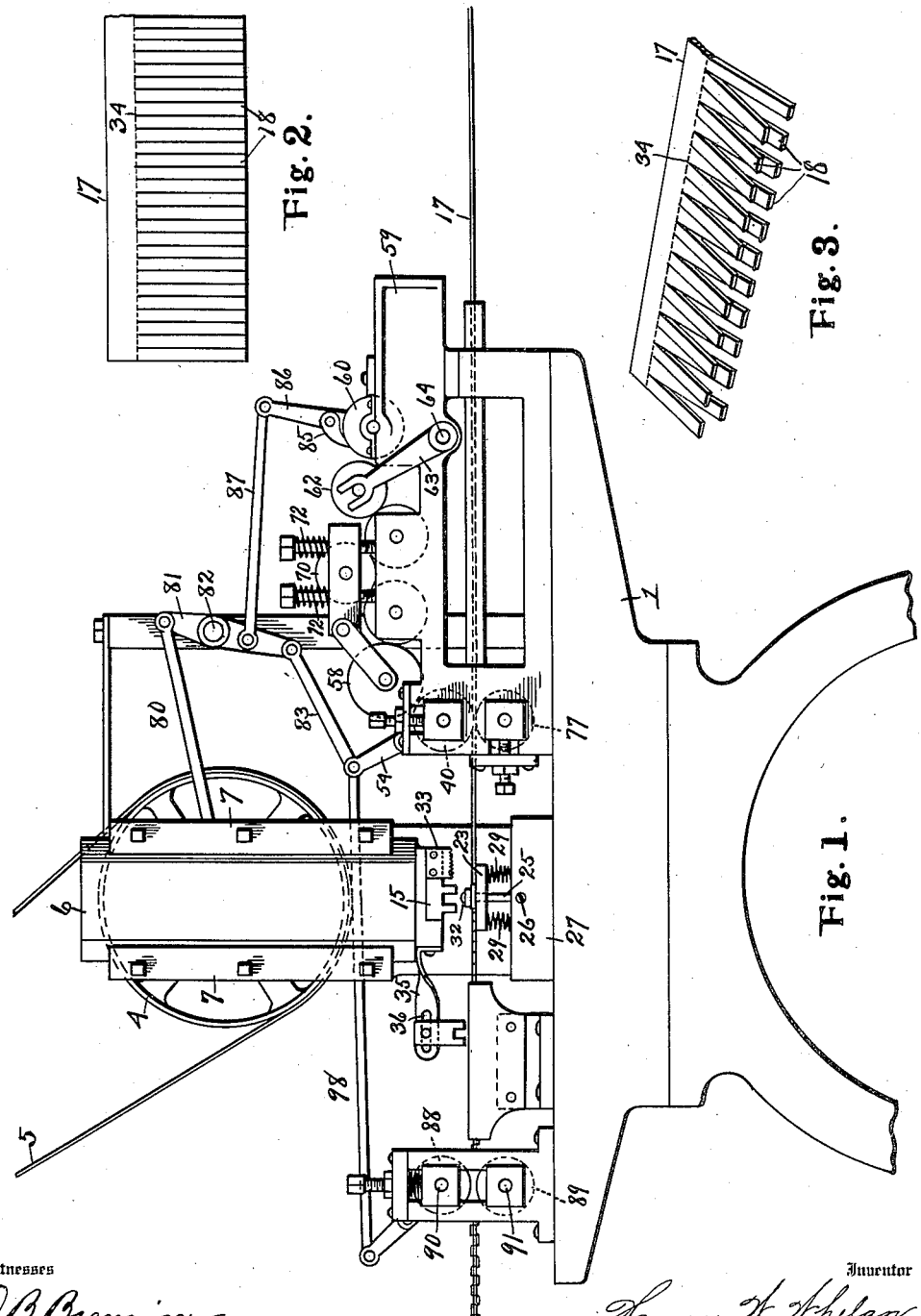

H. W. WHELAN.
MACHINE FOR PRINTING, CUTTING, AND SEPARATING PAPER MATCHES.
APPLICATION FILED FEB. 28, 1910.
1,049,019.
Patented Dec. 31, 1912.
5 SHEETS—SHEET 2.
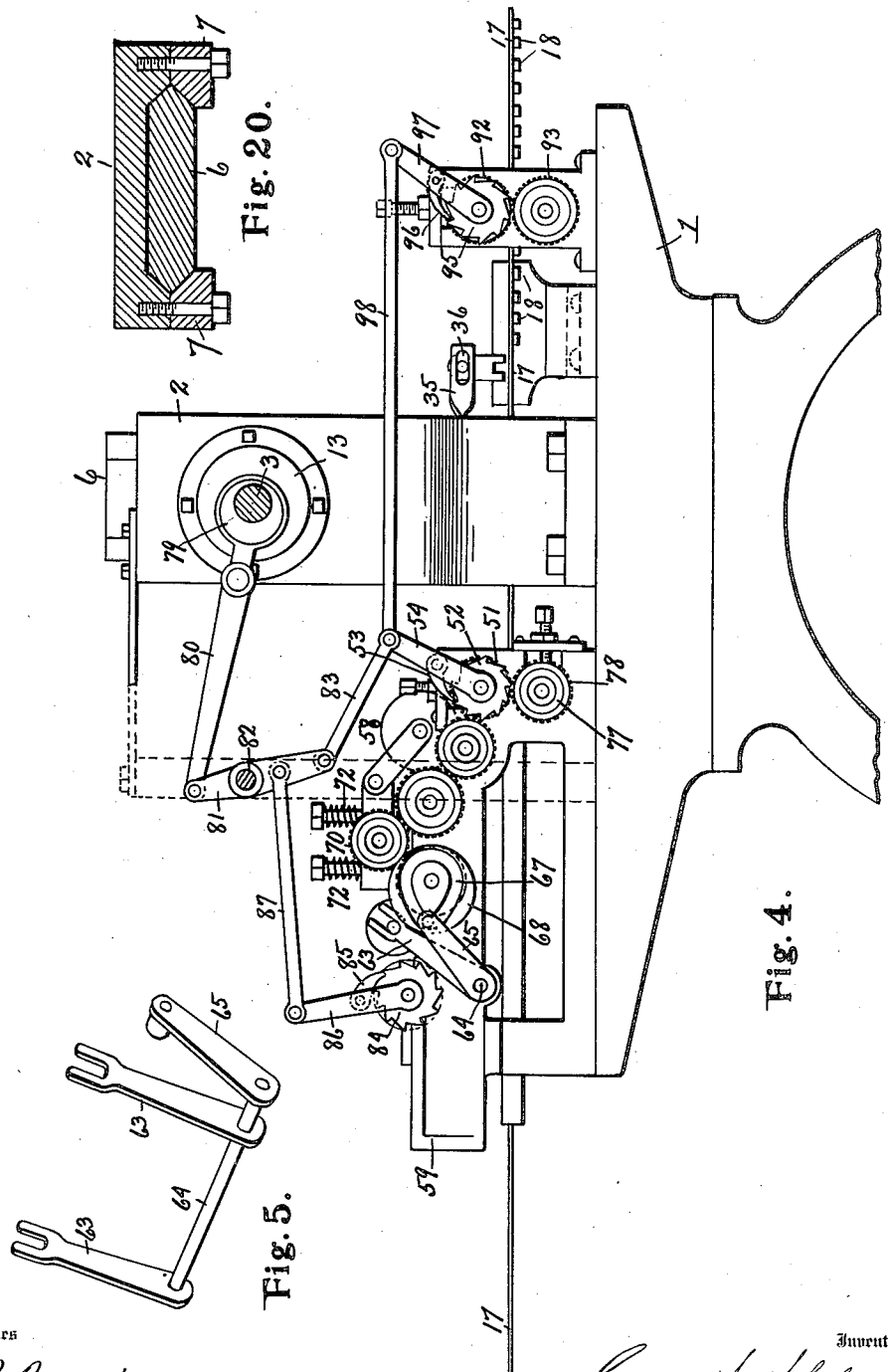

H. W. WHELAN.
MACHINE FOR PRINTING, CUTTING, AND SEPARATING PAPER MATCHES.
APPLICATION FILED FEB. 28, 1910.
1,049,019.
Patented Dec. 31, 1912.
5 SHEETS—SHEET 3.
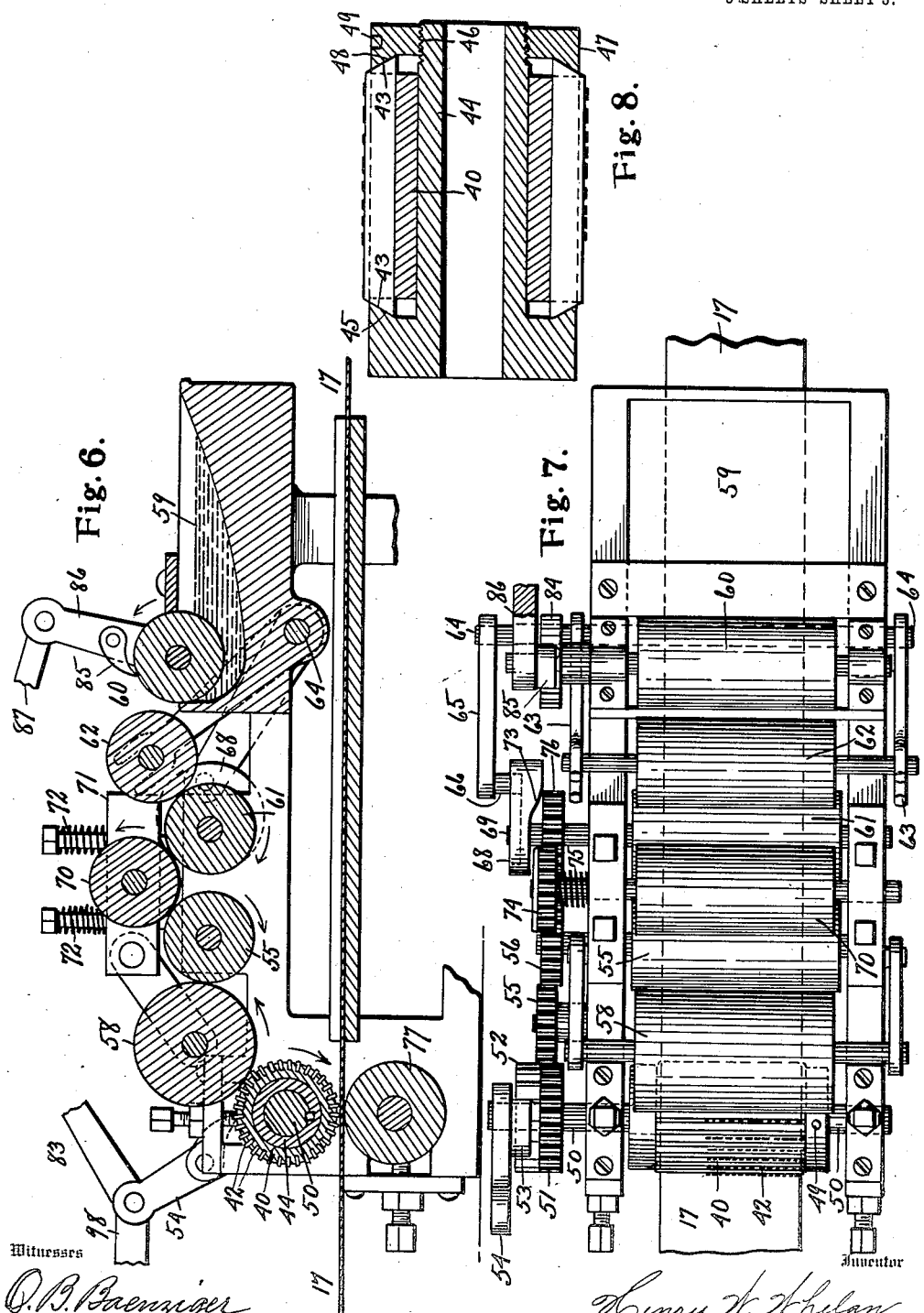

H. W. WHELAN.
MACHINE FOR PRINTING, CUTTING, AND SEPARATING PAPER MATCHES.
APPLICATION FILED FEB. 28, 1910.
1,049,019.
Patented Dec. 31, 1912.
5 SHEETS—SHEET 4.
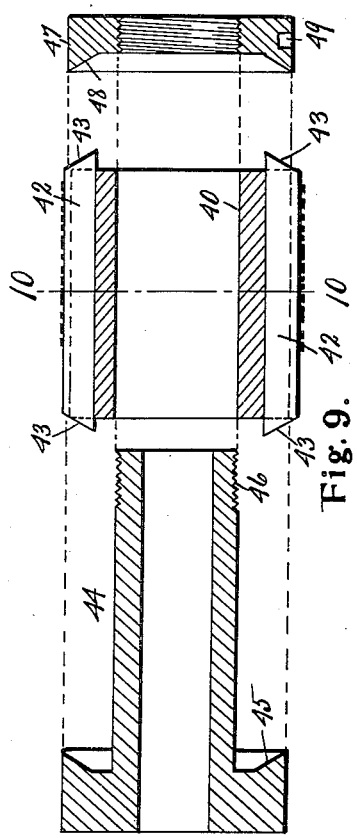
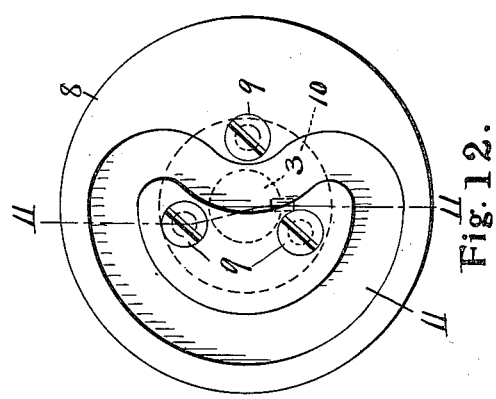
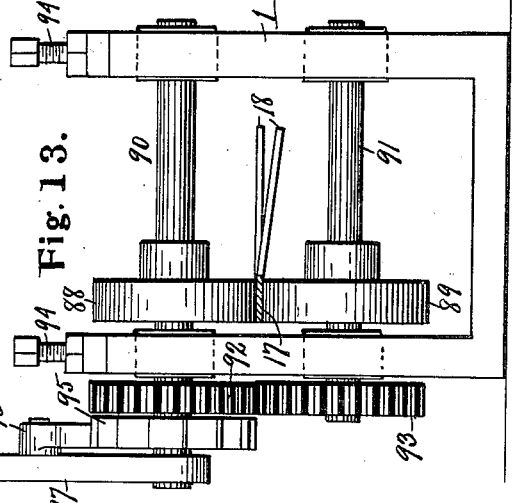
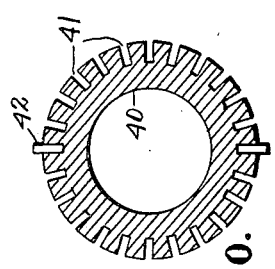
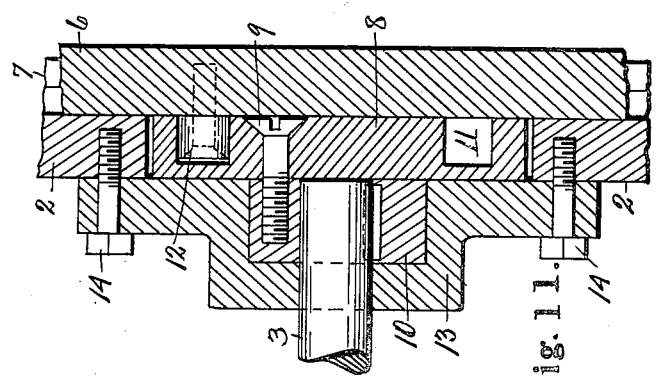

H. W. WHELAN.
MACHINE FOR PRINTING, CUTTING, AND SEPARATING PAPER MATCHES.
APPLICATION FILED FEB. 28, 1910.
1,049,019.
Patented Dec. 31, 1912.
5 SHEETS—SHEET 5.
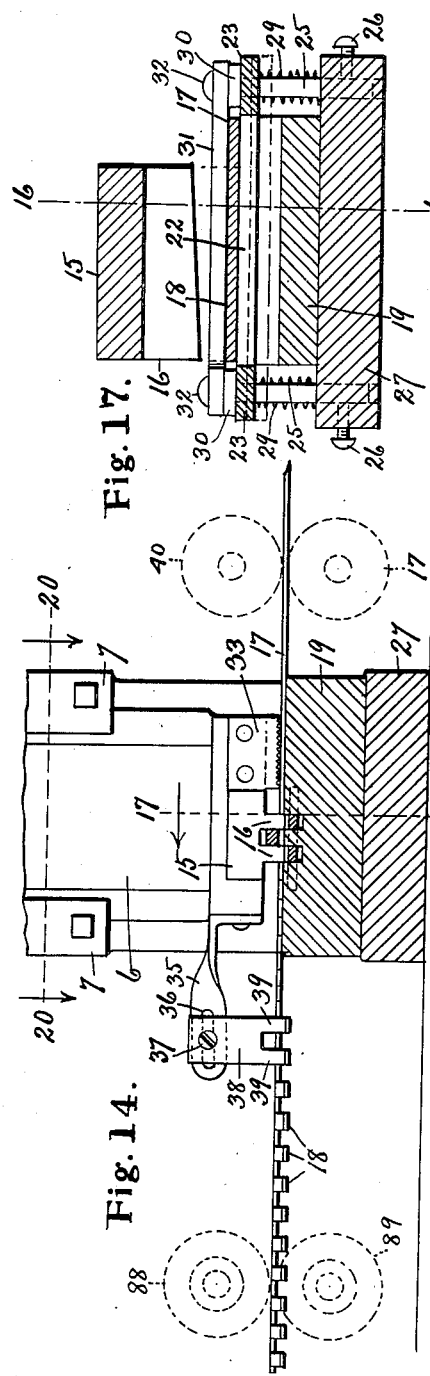
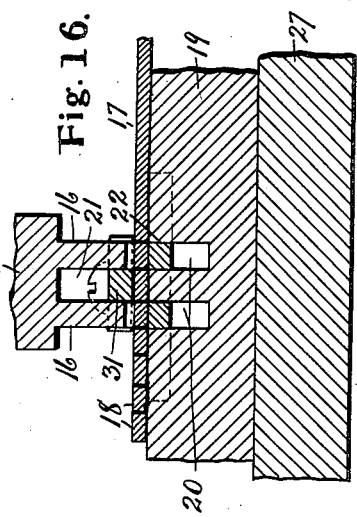
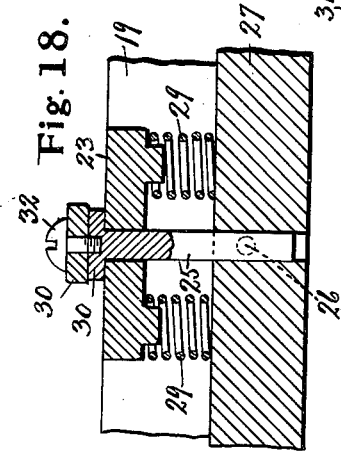
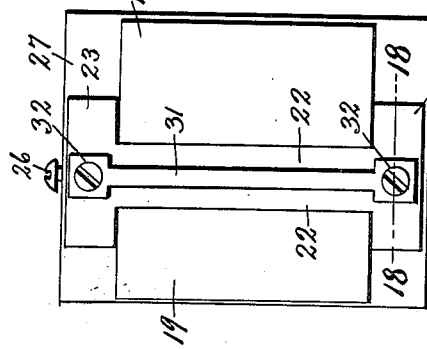

UNITED STATES PATENT OFFICE.

HENRY W. WHELAN, OF DETROIT, MICHIGAN, ASSIGNOR OF ONE-HALF TO ALBERT ROSS, OF DETROIT, MICHIGAN.

MACHINE FOR PRINTING, CUTTING, AND SEPARATING PAPER MATCHES.

1,049,019.  Specification of Letters Patent.  Patented Dec. 31, 1912.

Application filed February 28, 1910. Serial No. 546,331.

*To all whom it may concern:*

Be it known that I, HENRY W. WHELAN, a citizen of the United States, residing at Detroit, in the county of Wayne, State of Michigan, have invented certain new and useful Improvements in Machines for Printing, Cutting, and Separating Paper Matches; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a machine for printing, cutting, and separating paper matches, and consists in the construction and arrangement of parts hereinafter more fully set forth and pointed out particularly in the claims.

The primary object of the invention is to produce a machine of the character described of comparatively simple and inexpensive construction, wherein the arrangement is such as to automatically feed a strip of straw-board into the machine, print transverse lines of reading matter thereon, sever the strip through the major portion of its width between said lines of printing, and separate the printed splints at their free ends so that they shall stand out of contact with one another.

A further object is to provide for adjusting the printing characters with respect to the cutting or severing device so as to insure the severing of the splints midway between the lines of printing.

A further object is to provide a set of feed rollers at the front and rear ends of the machine, whereby each strip being operated on may be completely discharged from the machine, thereby obviating waste.

The above objects are attained by the mechanism illustrated in the accompanying drawings, in which:—

Figure 1 is a front elevation of a machine embodying my invention. Fig. 2 is a plan view of a portion of a strip of straw-board, or analogous material, showing said strip cut through or slit transversely for the major portion of its width to form the individual match splints. Fig. 3 is a perspective view of a portion of a strip showing the cut splints separated at their free ends to enable them to be dipped into a combustible composition and dried without causing them to stick together. Fig. 4 is a rear elevation of the machine, some of the parts being in section and others broken away. Fig. 5 is a perspective view of the reciprocatory arms and rock shaft on which they are mounted, said arms being adapted to carry the ink roller which receives the ink initially from the roller in the ink fount and carries it to the series of ink rollers over which the ink is conveyed to the printing characters. Fig. 6 is a central longitudinal section through the inking, printing, and feeding rollers, showing a strip of straw-board passing through the machine. Fig. 7 is a plan view of the mechanism shown in Fig. 6. Fig. 8 is a longitudinal section through the printing cylinder and the arbor with which it rotates and upon which it is circumferentially adjustable. Fig. 9 is a sectional view of the parts shown in Fig. 8, segregated. Fig. 10 is a transverse section through the printing cylinder, as on line 10—10 of Fig. 9. Fig. 11 is an enlarged fragmentary view in vertical section through the reciprocatory slide carrying the cutting, perforating, and separating devices, and through the rotatable disk having a cam way therein through the medium of which said slide is reciprocated, the section through said cam disk being on line 11—11 of Fig. 12. Fig. 12 is an elevation of the cam disk. Fig. 13 is an elevation of the discharge end of the machine. Fig. 14 is a fragmentary view partly in section showing the perforating, cutting, and separating devices in operation. Fig. 15 is a plan view of a portion of the bed of the machine, showing the depressible plate therein. Fig. 16 is a fragmentary view in section through the bed of the machine, as on line 16—16 of Fig. 17. Fig. 17 is a fragmentary view in section transversely of the bed of the machine, and through the die plate carrying the cutting members, the line of said section being indicated by dotted line 17—17 of Fig. 14. Fig. 18 is an enlarged fragmentary view in section as on line 18—18 of Fig. 15. Fig. 19 is a perspective view of the depressible plate located in the bed of the machine upon which the cutting members of the die act, and of the stripping bar fixedly disposed over said depressible plate which serves to strip from between the cutting members the severed splint that enters therebetween at each operation of the cutting die. Fig. 20 is a transverse section through the supporting upright and sliding head mounted thereon, the line of said section being indicated by dotted line 20—20 on Fig. 14.

Referring to the characters of reference, 1 designates the frame of the machine which may be of any suitable construction, and which upon its rear side is provided with a supporting upright 2 carrying the main shaft 3 on which is a pulley 4 (see Fig. 1) adapted to be driven by a belt 5 from any suitable source of power. Mounted upon the face of the upright 2 is a vertically reciprocatory slide 6 held in place by suitable guides 7 bolted to said upright. An intermittent vertical reciprocation is imparted to the slide 6 through the medium of a cam disk 8 secured to the end of the shaft 3 by means of screw bolts 9 which pass through said disk and into a collar 10 keyed to said shaft. The cam disk is let into the upright 2 and is provided in the face thereof with a cam way 11 in which the antifriction roller 12 carried by the slide 6 lies, as clearly shown in Fig. 11. A bearing plate 13 embraces the shaft and collar 10 to afford support for the end of said shaft, and is secured to the rear face of the upright 2 by the bolts 14. It will now be understood that a rotation of the cam disk will cause a vertical reciprocation of the slide 6 through the engagement of the anti-friction roller on said slide with the cam way in said disk, the shape of said cam way being such as to cause the reciprocatory movement of the slide to be intermittent because of the fact that the greater portion of the cam way 11 is concentric with the axis of said disk, as clearly shown in Fig. 12.

The lower end of the slide 6 carries a die block 15 having the depending cutting or shearing members 16. The thickness of these cutting or shearing members is equal to the width of the match splints it is desired to cut and they are spaced from each other a distance equal to the thickness thereof. I have shown two of the shearing members 16 depending from the die block, each of which is adapted to cut through the straw-board strip 17 to sever a match splint 18 therefrom. The space between said shearing members being equal to the width of the members themselves, four match splints 18 are severed from the straw-board strip at each operation of passing the shearing members therethrough. The bed-plate 19 of the machine is recessed, as shown at 20, to allow the cutting or shearing members 16 to enter therein. The two match splints directly under the shearing members 16 which are severed by the descent thereof, are carried downwardly into said depressions by the downward movement of said shearing members, while the central splint which is formed at each downward stroke of the shearing members lies in the space 21 between said members. The straw-board strip 17 is fed intermittently into the machine, as hereinafter explained, the feeding mechanism being so timed that said strip is at rest while the shearing members operate thereon.

For the purpose of raising the severed splints 18 from the recesses 20 after each operation of cutting so as to enable the strip to be fed through the machine the required distance for a succeeding operation, there is mounted in the recesses 20 in the bed-plate 19 a depressible plate 22 having the extended end portions 23, and divided through the center by the opening 24 (see Fig. 19). The end portions 23 of said depressible plate extend beyond the margins of the bed-plate 19 and are mounted to slide vertically upon the guide pins 25 which are secured by the set screws 26 in the base portion 27 of the machine, the upper ends of said pins 25 passing through the openings 28 in the extended end portions 23 of said depressible plate. For the purpose of lifting said plate after it shall have been depressed, coiled springs 29 are employed at each end thereof which are interposed between the under face of the extended end portions 23 of said plate and the projecting margins of the base 27, as clearly shown in Figs. 17 and 18. The upper end of each of the pins 25 is provided with a head 30 which prevents the depressible plate from rising above the plane of the face of the bed-plate 19. The central splint of those severed by each operation of the shearing members, enters between said members as they descend in the operation of shearing, and were it not removed as the shearing members are raised, it would become torn off from the uncut margin of the strip by the succeeding operation of feeding said strip through the machine.

To strip from between the shearing members the middle splint of those severed by each downward movement of the shearing members through the straw-board strip, there is employed a stripping bar 31, shown in perspective in Fig. 19, the ends of which are secured to the heads of the pins 25 by the screws 32. This bar is rigid and is of such width as to lie between the shearing members 16 when they descend in the operation of cutting, said bar being disposed transversely of the machine above the bed-plate 19 such distance as to allow the straw-board strip 17 to be fed thereunder, as clearly shown in Fig. 17. By this arrangement the severed splint lying between the shearing members becomes interposed between said bar and the bed-plate, whereby upon the lifting of the shearing members, the severed splint will be stripped from between them, as clearly shown in Fig. 16. Mounted on the lower end of the slide 6 is a perforating plate 33 having teeth on the lower edge thereof. This plate is so set that at the limit of the downward movement of the slide 6, it will engage the straw-board strip 17 and perforate it longitudinally at the point of attachment of the splints 18 to the uncut margin of said strip, as clearly shown at 34 in Figs. 2 and 3. The shape of the shear members 16 is such that the heel of said shear members does not cut through the straw-board strip, the splints being severed only to the point of the line of perforation 34, so that the inner ends of all of the splints remain attached to the uncut margin of said strip. The purpose of perforating the margin of the strip at the point of union of the splints therewith is to effect a frangible attachment of the splints to the margin of the strip, thereby enabling the splints to be easily broken off for use.

To effect a separation of the free ends of the splints, as shown in Fig. 3, there is mounted on the lower end of the slide 6 a laterally projecting bracket 35 having a longitudinal slot 36 therein. Fastened to said bracket by means of a screw bolt 37 which passes through said slot is a depending plate 38 having the spaced fingers 39 on the lower end thereof which are adapted to engage each alternate splint 18 as the slide 6 descends and bend them downwardly, as clearly shown in Fig. 14, thereby separating the free ends of the splints so as to enable them to be dipped in the igniting composition without causing them to stick together. The perforating, cutting and separating devices being all attached to the slide 6, all of said operations are accomplished simultaneously upon the descent of said slide.

The printing of the spaced parallel lines upon the straw-board strip transversely thereof is accomplished by means of a rotatable printing cylinder 40 having the longitudinally extending peripheral channels 41 therein. Seated in said channels are the bars 42 carrying type or printing characters upon their outer edges for the purpose of printing any desired advertising matter upon the match splints. These bars are slightly longer than the cylinder and are provided with beveled ends 43. The cylinder 40 is adapted to slide onto a hollow mandrel 44 (see Figs. 8 and 9), said mandrel having at one end an annular shoulder with a beveled face 45 coinciding with the bevel 43 at the ends of the bars 42 carrying the printing characters. The outer end of the mandrel 44 is threaded, as shown at 46, and screwed thereon is a collar 47 also having a beveled face 48 which coincides with the bevel of the ends of the bars 42. By means of this arrangement, the cylinder 40 may be slipped onto the end of the mandrel 44 and secured thereon by turning the collar against said cylinder. The beveled faces 45 and 48 of the shoulder of the mandrel and the collar 47, respectively, engage the beveled ends of the bars 42, whereby as the collar 47 is screwed onto the mandrel, the cylinder becomes locked thereto and said bars become securely fastened in the channels in the cylinder. By loosening the collar 47, the cylinder is made free to revolve upon the mandrel, whereby it may be adjusted circumferentially so that the lines of printing from the printing characters on said bars 42 may be so positioned on the straw-board strip as to become centrally disposed upon the match splints after the operation of cutting. For the purpose of manipulating the collar 47, it is provided in its periphery with apertures 49 for the insertion of a suitable tool to enable said collar to be turned upon the threaded mandrel. By means of this arrangement of printing cylinder, the printing characters may be changed at will and readily and firmly secured in place, while the adjustability of the cylinder concentric with its axis enables the rows of printing to be made to perfectly register with the match splints.

The mandrel 44 is keyed or otherwise fastened to a shaft 50 which passes therethrough, said shaft being suitably journaled in the frame and carrying a gear wheel 51 thereon. Upon the outer face of said gear wheel is a ratchet 52 driven by a gravity pawl 53 mounted on the arm 54 which is pivotally mounted on the outer end of the shaft 50. Meshing with the gear 51 is an idler 55 which in turn meshes with a pinion 56 on the end of the shaft of the ink roller 57. The printing cylinder 40 and the ink roller 57 being geared together by the pinion 55 are caused to turn in the same direction. Interposed between the printing cylinder and the roller 55 is a relatively large inking roller 58 which rolls in peripheral contact with each and which conveys the ink to the printing characters in the printing cylinder. Within the ink fount 59 is a roller 60 which is partially immersed in the ink. Adapted to swing into contact with the roller 60 and back into contact with the inking roller 61 is a reciprocatory roller 62, the ends of whose shaft are supported in the forked arms 63 mounted on the opposite ends of the rock shaft 64. One end of said rock shaft carries an arm 65 (see Fig. 5) having at its free end an anti-friction roller 66 which engages in a cam way 67 (see Fig. 4) in the face of the disk 68 mounted on the outer end of the shaft 69 of roller 61, whereby as the disk 68 revolves, the arm 65 will be reciprocated to swing the arms 63 forth and back and successively present the roller 62 in contact with the periphery of roller 60 and roller 61. Lying between the rollers 55 and 61 and in peripheral contact with both so as to convey ink from one to the other, is a roller 70, the shaft of which is journaled in the vertically movable blocks 71 through which said shaft is also movable longitudinally. The springs 72 (see Fig. 6) hold the roller 70 downwardly with tension against the rollers 55 and 61 while said roller is moved longitudinally by engagement of the cam face 73 (see Fig. 7) against the face of the gear 74 on the end of the shaft of said roller, the spring 75 on said roller shaft turning said roller after movement by said cam. This movement of the roller 70 assists in more perfectly distributing the ink. Movement is imparted to the rollers 61 and 70 by means of the gear 74 on the shaft of roller 70 meshing with gear 56 and with the gear 76 on the shaft of roller 61. Below the printing cylinder 40 is a feed roller 77 between the periphery of which and the under side of the printing cylinder the straw-board strip 17 is fed. To provide for operating the feed roller 77 and the printing cylinder in unison, they are coupled together by the gear 78 (see Fig. 4) on the shaft of the roller 77 which meshes with the gear 51 on the shaft of the printing cylinder.

For the purpose of imparting an intermittent rotation to the printing and feeding rollers, there is employed upon the shaft 3 an eccentric 79 (see Fig. 4), connected by an eccentric rod 80 with the upper end of a lever 81 fulcrumed at 82 on the frame and having pivoted to its lower end a link 83 which is in turn pivotally coupled to the upper end of the arm 54 carrying the pawl 53. It will therefore be understood that as the lever 81 is swung upon its fulcrum, the arm 54 will be actuated to cause the pawl to intermittently engage the ratchet 52 and impart an intermittent rotation to the shaft of the printing cylinder and a like rotation to the feed roller 77 through the gear 78. The rotation of the gear 51 will impart a like rotation to the printing rollers through the chain of gears for turning said rollers connected therewith. The roller 60 in the ink fount is rotated through the medium of the ratchet 84 on the shaft thereof engaged by a pawl 85 carried by a pivoted arm 86 attached at its upper end to the lever 81 by the connecting rod 87. There is nothing especially new in the arrangement herein shown for conveying the ink from the fount to the printing roller; any suitable arrangement other than the one shown may be employed without departing from the spirit of the invention.

In a machine of this character it is necessary to have feeding rollers at the discharge end of the machine to discharge the straw-board strip from the machine after said strip shall have passed through the feeding and printing rollers. For this reason I employ at the discharge end of the machine the rollers 88 and 89 mounted upon the shafts 90 and 91, respectively, suitably journaled in the frame and carrying the meshing gear wheels 92 and 93. The upper roller 88 is made adjustable by means of the screws 94 so as to regulate the pressure upon the straw-board strip 17 which passes between them. It is absolutely essential that these rollers which withdraw or discharge the straw-board strip from the machine shall revolve in timed relation with the feeding and printing rollers and at the same rate of speed. This is accomplished by means of the ratchet 95 on the shaft of roller 90 adapted to be engaged by a pawl 96 carried by the arm 97 pivoted on the end of said shaft and connected at its upper end (see Fig. 4) by means of the connecting rod 98 with the arm 54 that actuates the printing and feeding rollers. By means of this arrangement the discharge rollers 88 and 89 are caused to turn at the same time the printing and feeding rollers are turned, and at the same rate of speed. The feeding of the straw-board strip through the machine is so timed with respect to the perforating, cutting, and separating operations as to cause the straw-board strip to remain at rest while said operations are taking place, and to feed through the machine during the time the slide 6 is raised between each of said operations.

It will now be understood that by means of this machine, a straw-board strip of the required width may be fed into the machine and that while passing therethrough the several parts will operate thereon to print transverse lines upon the strip, sever said strip between said lines for the major portion of its width, perforate the severed match splints along the line of attachment of said splints to the uncut margin of said strip and separate the free ends of the match splints so as to cause them to stand well apart preparatory to dipping.

Having thus fully set forth my invention, what I claim as new and desire to secure by Letters Patent, is:—

1. A machine for the purpose set forth, comprising means for feeding a straw-board strip into the machine, means for printing lines in spaced parallel relation upon said strip transversely thereof, means for cutting through the major portion of the strip transversely between said lines of printing without entirely severing the strip, and means engaging the uncut marginal portion of the strip for withdrawing it from the machine after passing the feeding means.

2. A machine for the purpose set forth, comprising means for feeding a straw-board strip through the machine, means for cutting through the major portion of said strip transversely of the strip and of the direction of feed thereof to form match splints connected at their base with the marginal portion of said strip, and means for perforating said marginal portion at the point of attachment of the match splints thereto progressively as the strip is fed.

3. A machine for the purpose set forth, comprising a bed-plate, means for feeding a strip of straw-board over said bed-plate, a reciprocatory shearing member adapted to shear through the bed-plate to cut the major portion of the straw-board strip transversely of the line of feed into match splints attached to an uncut marginal portion of said strip, and a yielding member in the bed plate below said shearing member for returning the severed end of the splint to the plane of the bed of the machine after the operation of shearing.

4. A machine for the purpose set forth, comprising a bed-plate, means for feeding a strip of straw-board over said bed-plate, a reciprocatory shearing device working through the bed-plate to sever the major portion of said strip transversely into separate match splints attached to an uncut marginal portion, a depressible member in the bed-plate below the shearing member to return the severed splint to the plane of the bed-plate after the operation of shearing, means for perforating the straw-board strip at the juncture of the match splints with the uncut marginal portion thereof, and means for depressing each alternate splint to separate the free ends of the splints for dipping.

5. A machine for the purpose set forth, comprising a bed-plate having a depressible plate therein with a central opening therethrough, means for returning said plate to the level of the bed-plate after it shall have been depressed, vertically reciprocatory shearing members mounted over said depressible plate and spaced from each other, a rigid stripping bar between the shear members, and means for intermittently feeding a straw-board strip over said bed-plate below said bar.

In testimony whereof, I sign this specification in the presence of two witnesses.

HENRY W. WHELAN.

Witnesses:
O. B. BAENZIGER,
I. G. HOWLETT.